United States Patent
Bezot et al.

(10) Patent No.: US 10,116,851 B2
(45) Date of Patent: Oct. 30, 2018

(54) OPTIMIZED VIDEO DENOISING FOR HETEROGENEOUS MULTISENSOR SYSTEM

(71) Applicant: SAFRAN ELECTRONICS & DEFENSE, Boulogne-Billancourt (FR)

(72) Inventors: Grégoire Bezot, Boulogne-Billancourt (FR); Joël Budin, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 103 days.

(21) Appl. No.: 15/123,508

(22) PCT Filed: Mar. 3, 2015

(86) PCT No.: PCT/EP2015/054409
§ 371 (c)(1),
(2) Date: Sep. 2, 2016

(87) PCT Pub. No.: WO2015/132255
PCT Pub. Date: Sep. 11, 2015

(65) Prior Publication Data
US 2017/0078546 A1    Mar. 16, 2017

(30) Foreign Application Priority Data
Mar. 3, 2014    (FR) ...................... 14 51719

(51) Int. Cl.
*H04N 5/228*    (2006.01)
*H04N 5/225*    (2006.01)
(Continued)

(52) U.S. Cl.
CPC ............ *H04N 5/2258* (2013.01); *G06T 5/00* (2013.01); *G06T 5/002* (2013.01); *G06T 5/50* (2013.01); *G06T 7/0024* (2013.01); *G06T 7/20* (2013.01); *H04N 5/23254* (2013.01); *H04N 5/23267* (2013.01); *H04N 5/265* (2013.01);
(Continued)

(58) Field of Classification Search
CPC .......... G06T 2207/20182; G06T 5/002; H04N 5/217; H04N 5/357–5/365
See application file for complete search history.

(56) References Cited

U.S. PATENT DOCUMENTS

2006/0056724 A1* 3/2006 Le Dinh ................. G06K 9/40
                                                                382/274
2006/0119710 A1    6/2006 Ben-Ezra et al.
(Continued)

OTHER PUBLICATIONS

Written Opinion of the International Searching Authority dated May 7, 2015, issued in corresponding International Application No. PCT/EP2015/054409, filed Mar. 3, 2015, 11 pages.
(Continued)

*Primary Examiner* — Sinh Tran
*Assistant Examiner* — Selam Gebriel
(74) *Attorney, Agent, or Firm* — Christensen O'Connor Johnson Kindness PLLC

(57) ABSTRACT

The description relates in particular to a method for temporal denoising of image sequences with the aid of at least two sensors of different types. The description also relates to an optronics device, a computer program and a storage medium for the implementation of such a method.

12 Claims, 2 Drawing Sheets

(51) Int. Cl.
*H04N 5/232* (2006.01)
*H04N 5/33* (2006.01)
*G06T 5/00* (2006.01)
*G06T 5/50* (2006.01)
*G06T 7/00* (2017.01)
*G06T 7/20* (2017.01)
*H04N 5/265* (2006.01)

(52) U.S. Cl.
CPC ... *H04N 5/332* (2013.01); *G06T 2207/10016* (2013.01); *G06T 2207/10048* (2013.01); *G06T 2207/20021* (2013.01); *G06T 2207/20076* (2013.01); *G06T 2207/20182* (2013.01); *G06T 2207/30252* (2013.01)

(56) References Cited

U.S. PATENT DOCUMENTS

| | | | |
|---|---|---|---|
| 2009/0002501 A1 | 1/2009 | Silsby et al. | |
| 2011/0069189 A1* | 3/2011 | Venkataraman | H01L 27/14618 348/218.1 |
| 2011/0229029 A1* | 9/2011 | Kass | G06T 5/002 382/168 |
| 2013/0142397 A1 | 6/2013 | Jacquelin et al. | |
| 2013/0250123 A1 | 9/2013 | Zhang et al. | |
| 2014/0153842 A1* | 6/2014 | Pescatore | G06T 5/002 382/264 |
| 2014/0341480 A1* | 11/2014 | Hamada | G06T 5/002 382/264 |
| 2015/0029349 A1* | 1/2015 | Ben Israel | H04N 5/23277 348/208.4 |

OTHER PUBLICATIONS

International Preliminary Report of Patentability dated Sep. 6, 2016, issued in corresponding International Application No. PCT/EP2015/054409, filed Mar. 3, 2015, 1 page.

International Search Report dated May 7, 2015, issued in corresponding International Application No. PCT/EP2015/054409, filed Mar. 3, 2015, 2 pages.

Written Opinion of the International Searching Authority dated May 7, 2015, issued in corresponding International Application No. PCT/EP2015/054409, filed Mar. 3, 2015, 9 pages.

* cited by examiner

OPTIMIZED VIDEO DENOISING FOR HETEROGENEOUS MULTISENSOR SYSTEM

The invention relates to techniques for optimized video denoising.

A heterogeneous multisensor imaging system is a video capture system having at least two sensors of different types (the system is a dual-sensor system if it has two sensors). A video sequence is considered to be a sequence of images captured at given times.

Under difficult image capture conditions, for example conditions of low light for a day sensor, or for example in wet weather for a band 3 thermal sensor, it is useful to denoise the video to improve the signal-to-noise ratio, and in particular to perform temporal denoising.

A temporal denoising technique makes use of a temporal preconception concerning a video signal. Temporal denoising is easily applied to a video captured by a stationary sensor filming a stationary scene. One can then simply normalize the signal along the temporal axis of the video (for example, using a moving average over a certain number of consecutive images). However, in real situations, the sensor and/or the scene are often in motion (displacements or vibrations for example), and a simple temporal normalization generates blur in the denoised video, because the different averaged elements do not necessarily all correspond to the same element in the scene. For example, a sensor on board a moving vehicle may be shooting a scene in which other vehicles are moving.

It is possible to use more complex temporal denoising techniques, for example making use of motion estimation techniques, which aim to align the pixels of the video images with a common reference, and therefore enable temporal normalization without generating blur. In the temporal denoising techniques of the prior art, we thus distinguish between the motion analysis phase and the temporal normalization phase (which corresponds to an average of multiple images), the former being used to compensate for the fact that we do not know how to average the images if the sensor capturing these images (and/or some or all of the images themselves) is in motion.

However, the prior art techniques reveal their limitations in the context of low signal-to-noise ratios. Under those circumstances, the motion analysis is severely compromised and it is very difficult to eliminate noise while preserving the desired signal. In such situations, it is difficult to define the parameters for these techniques. Generally, depending on the parameters, either the technique is completely ineffective or it greatly degrades the desired signal.

The invention aims to improve the situation.

One aspect of the invention relates to a method for temporal denoising of a sequence of images, said method comprising:

/a/ capturing, by a first sensor, a sequence of first images corresponding to a given scene, each first image being divided into elements each associated with a corresponding area of said first image, /b/ capturing, by a second sensor of a different type than the first sensor, a sequence of second images corresponding to said given scene, each second image corresponding to a first image, each second image being divided into elements each associated with a corresponding area of said second image, each pair of element and associated area of the second image corresponding to a pair of element and associated area of the corresponding first image, /c/ obtaining, by a calculation circuit, a first sequence of images derived from the sequence of first images and of a second sequence of images derived from the sequence of second images, /d/ obtaining, by a calculation circuit, for each area of each of the images of the first and second sequences of images, an associated weight, /e/ obtaining, by a calculation circuit, a first weighted sequence of images, in which each element of each image is equal to the corresponding element of the first sequence of images weighted by the weight associated with the area associated with said corresponding element, and a second weighted sequence of images, in which each element of each image is equal to the corresponding element of the second sequence of images weighted by the weight associated with the area associated with said corresponding element, /f/ obtaining, by a calculation circuit, a sequence of enhanced images resulting from combining sequences of images comprising the first weighted sequence of images and the second weighted sequence of images, /g/ obtaining, by a calculation circuit, a motion estimation based on the obtained sequence of enhanced images, /h/ obtaining, by a calculation circuit, based on the motion estimation obtained, a spatial alignment of the images of a sequence of images to be displayed derived from sequences of images corresponding to the given scene and comprising the sequence of first images and the sequence of second images, /i/ a temporal denoising, by a calculation circuit, based on the determined spatial alignment of the sequence of images to be displayed.

This method is particularly advantageous in that it combines information from at least two sensors, and in that it thus optimizes the video denoising by performing a motion estimation based on the best information available. As the two sensors are of different types, it can be expected that one or the other will be more appropriate for a current context, and the method thus takes into account the better of the two sensors according to the context. The method thus performs a temporal denoising on the basis of dynamic image processing, using their actual content (not just an initial assumption concerning the theoretical content of the images). For example, in the case of sensors operating in different spectral bands, "merging" the heterogeneous information from the two spectral bands allows optimized video denoising in comparison to denoising performed separately on each of the two spectral bands using conventional techniques.

Another aspect of the invention relates to a computer program comprising a sequence of instructions which, when executed by a processor, lead the processor to implement a method according to the above aspect of the invention.

Another aspect of the invention relates to a computer-readable non-transitory storage medium, said medium storing a computer program according to the above aspect of the invention.

Another aspect of the invention relates to an optoelectronic device for temporal denoising of a sequence of images, said optoelectronic device comprising:

a first sensor arranged to capture a sequence of first images corresponding to a given scene, each first image being divided into elements each associated with a corresponding area of said first image, a second sensor of a different type than the first sensor, arranged to capture a sequence of second images corresponding to said given scene, each second image corresponding to a first image, each second image being divided into elements each associated with a corresponding area of said second image, each pair of element and associated area of the second image corresponding to a pair of element and associated area of the corresponding first image, a calculation circuit arranged to obtain a first sequence of images derived from the sequence of first images and a second sequence of images derived from the sequence of second images, a calculation circuit arranged to obtain, for each area of each of the images of the first and second sequences of images, an associated weight, a calculation circuit arranged to obtain: a first weighted sequence of images, in which each element of each image is equal to the corresponding element of the first sequence of images weighted by the weight associated with the area associated with said corresponding element; and a second weighted sequence of images, in which each element of each image is equal to the corresponding element of the second sequence of images weighted by the weight associated with the area associated with said corresponding element, a calculation circuit arranged to obtain a sequence of enhanced images resulting from combining sequences of images comprising the first weighted sequence of images and the second weighted sequence of images, a calculation circuit arranged to obtain a motion estimation based on the obtained sequence of enhanced images, a calculation circuit arranged to obtain, based on the motion estimation obtained, a spatial alignment of the images of a sequence of images to be displayed derived from sequences of images corresponding to the given scene and comprising the sequence of first images and the sequence of second images, a calculation circuit arranged to perform a temporal denoising, based on the obtained spatial alignment of the sequence of images to be displayed.

This optoelectronic device is advantageous inter alia in that it allows implementing a method according to an aspect of the invention.

Other features, objects, and advantages of the invention will be apparent from reading a description of some of its embodiments.

The invention will also be better understood with the aid of drawings, in which.

Figure 1:
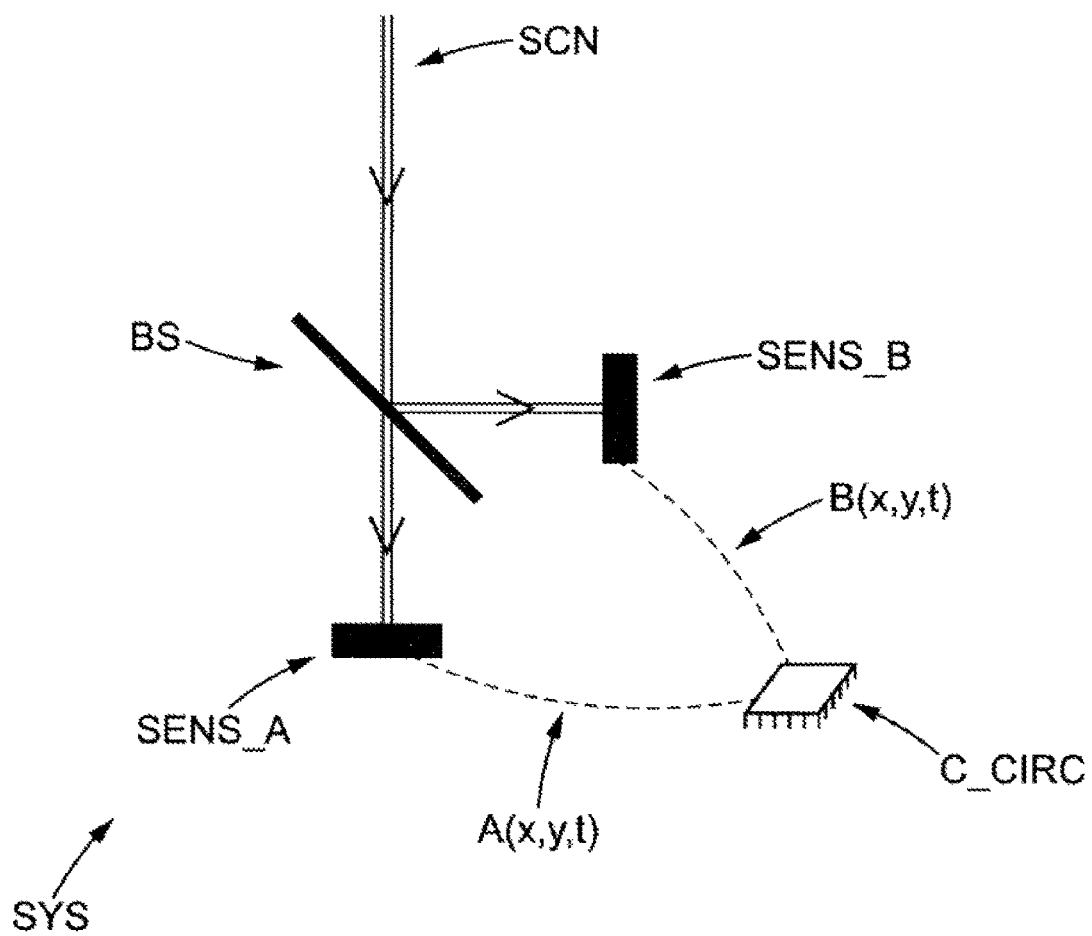
FIG. 1 shows an example of an optoelectronic device according to one possible embodiment of the invention.

According to a first embodiment, a method for temporal denoising of a sequence of images comprises capturing, by means of a first sensor, a sequence of first images $A(x,y,t)$ corresponding to a given scene. The scene corresponds to the field of view of the first sensor. The parameters x, y, and t respectively denote the spatial index for the columns, the spatial index for the rows, and the temporal index for the image number in the sequence.

According to one possible implementation, the first sensor is an optoelectronic sensor operating in the visible range of the electromagnetic spectrum, or in the infrared or ultraviolet.

The sequence of first images may include, for example, 1000 images captured over ten seconds at fixed intervals of 10 ms. Other values are of course possible.

According to the first embodiment, each first image (of the sequence of first images $A(x,y,t)$) is divided into elements that are each associated with a corresponding area of said first image.

According to one possible implementation, each element is a pixel of the image, meaning the smallest portion of an image that the sensor is able to detect. The term "pixel" is an English acronym that has now entered the French language, resulting from a contraction of the words "picture" and "element". In another possible implementation, each element is a group of pixels (for example a group of three pixels respectively corresponding to the colors red, green, and blue and together representing a color).

According to one implementation, the intersection of any two elements is zero (for all elements of the image) and the union of the elements corresponds to the complete image.

Each image of the sequence can thus be divided into one million pixels (corresponding to a square of one thousand pixels by one thousand pixels), each representing an element, it being understood that other image resolutions are of course possible.

Thus, in the expression $A(x,y,t)$ of this example, x represents the abscissa of a pixel, which can range from 0 to 999, y is the ordinate of a pixel, which can range from 0 to 999, and t denotes the time at which the image in question in the sequence was captured, and can range from 0 ms to 999 ms.

According to one possible implementation, each element is a pixel of the image, and each associated area is a rectangle of the image that is centered on the pixel concerned. For example, the area may be a rectangle of $2*n+1$ by $2*p+1$ pixels (n and p being positive integers), $2*n+1$ designating the width of the area and $2*p+1$ its height, the area being centered on the pixel concerned. For example, $n=p=5$ means that the area is a square of 11 pixels per side. Thus, for a pixel of coordinates (N,P), the associated area includes all pixels whose abscissa is between N−n and N+n and whose ordinate is between P−p and P+p. For pixels located less than n pixels from the left or right edge of the image, or less than p pixels from the top or bottom edge of the image (in other words in a peripheral region of the image), the area can be truncated accordingly. The area may thus may be reduced to a size of as little as n+1 by p+1 pixels, in the peripheral region of the specified image (case of the four corners of the image). Alternatively, the calculations that follow may be performed while ignoring this peripheral region (usually negligible) of the image (to avoid areas indicating somewhat biased information that one may prefer not taking into account), in other words working with images where the edges are cropped off (images without this peripheral region of p pixels at the top, of p pixels at the bottom, of n pixels on the left, and of n pixels on the right).

Other types of areas are possible. For example, the area corresponding to an element may be a disk centered on this element. This disk is possibly truncated (when the distance of the element to an edge of the image is less than the disk diameter), unless, alternatively, the peripheral region of the screen (where the disc would otherwise be truncated) is excluded as was discussed in the previous example. Other forms (besides a disk or rectangle) are also possible.

According to a simplified implementation (possibly requiring fewer resources, inter alia memory and processor), but in principle less effective, the image is divided into areas wherein any two areas have no intersection (the intersection is the empty set) and whose union represents the entire image, each element belonging to (only) one of the areas so defined. For example, an image of 1000*1000 pixels can be divided into 10,000 areas of 10*10 pixels. Each element (for example a pixel) is associated with the area to which it belongs. This means replacing a "sliding area" with a fixed area, which is less representative for elements positioned near the edge than for those located near the center. This simplified implementation is likely to introduce artifacts but may improve the situation.

According to the first embodiment, the method comprises capturing, by means of a second sensor of a different type than the first sensor, a sequence of second images B(x,y,t) corresponding to said given scene.

According to one possible implementation, the field of view of the second sensor is exactly the same as that of the first sensor. Both sensors can, for example, use shared optics and a prism (or similar mechanism) can separate the image to be sent to each sensor (other implementations are possible).

According to one possible implementation, said two sensors (which may be rigidly secured) are each associated with separate optics. In this case, the field of view of the two sensors may be slightly different. The field of view of the second sensor may in particular be slightly offset with respect to the first sensor, and be affected by parallax.

However, there are known techniques for correcting these phenomena and for defining the common portion of the respective fields of view of the two sensors (the common portion can then define the scene). For example, for parallax, it is possible to apply digital processing to the captured data, or (possibly in addition) to have the two sensors focused differently, in "crosseyed" manner, according to the distance to an observed object (mechanical solution with at least one movable sensor having its movement controlled by a servomotor). According to one possible implementation, any image portions of the sequences of first and second images that are not in common (in other words the portions of the scene that would be seen by one sensor but not by the other) are ignored when determining the enhanced image I(x,y,t) which will be described below. In another implementation, the enhanced image I(x,y,t) determined below by ignoring portions not in common is then supplemented by the portions not in common in order to provide additional information potentially relevant to the motion estimation.

According to one possible implementation, the second sensor is, similarly to the first sensor, an optoelectronic sensor operating in the visible range of the electromagnetic spectrum, or in the infrared or ultraviolet. However, the two sensors are of different types.

The sensors may be of different types in that they operate in different spectral bands. For example, one sensor may operate in the visible spectrum and the other in the 3-5 µm or 8-12 µm band of the infrared spectrum. In general, the various spectral bands may be: the ultraviolet band, the visible band, the very near infrared band (at the edge of the visible band), "band 1" (near infrared, from 1 to 3 µm—this band being used for the detection of bodies at high temperatures, for example from 1000 to 2000K), "band 2" (mid infrared, for detecting bodies at moderate temperatures of 600K, for example aircraft), or "band 3" (far infrared, for detecting bodies at around 300K, which can be used for night vision (as can band 2).

In one possible implementation, two sensors are not considered as being of different types just because they sense different spectral sub-bands within one of the spectral bands mentioned in the preceding two sentences. For example, sensors each operating in a separate sub-band of a given band (for example band 2 above) are considered to be of the same type, to the extent (but only to the extent) that the vision properties in these two sub-bands are relatively the same (meaning that if one sensor can see well then the other can also see relatively well, and if one is seeing poorly then the other is also seeing relatively poorly). A sensor is considered to see an object "well" in the scene if it captures this object with a good signal-to-noise ratio (and conversely, it sees poorly if the signal-to-noise ratio is bad, and therefore if it is difficult to distinguish the object from the noise). As another example, according to one possible implementation in which the color is not a true discriminant (for the intended use of the method), and all other characteristics of the sensors being equal, a sensor that captures red light and a sensor that captures blue (or green) light both operate in the band of visible light and are considered to be of the same type.

It is useful to obtain information likely to be complementary from at least two sensors, or at least information likely to be such that even if the information from one sensor cannot be used, that from the other sensor is likely to be usable (of course, it is not excluded that in certain circumstances, two sensors of different types both see the scene perfectly, or that neither of them see it correctly). It is also advantageous to take advantage of the fact that in some cases, certain parts of an image from one sensor are usable and others not, while for a corresponding image from another sensor, the usable or unusable parts are different. The method can thus take the best from each sensor, for the same scene at the same moment.

The use of sensors operating in different spectral bands is advantageous, because spectral bands can be unevenly affected by meteorological parameters (humidity, temperature, snowfall or rain, fog, hail, etc.). They can also be unevenly affected by other parameters such as time of day, brightness (possibly artificial), optical properties of objects in the scene such as their reflective properties (specular, diffuse, or other), whether they are light or dark in nature, etc. All kinds of parameters are thus likely to affect the image capture differently, depending on the spectral band. In addition, the image capture may possibly rely on different physical phenomena depending on the spectral band concerned. For example, a sensor in the visible frequencies basically works in reflective mode (light reflected by objects in the scene), while an infrared sensor functions more with the radiation emitted by objects in the scene. At low level of color (for example at sunset, when there is little flux), a color sensor can thus have difficulty producing relevant information, while a sensor in the near-infrared can observe some details without difficulty. Conversely, when it is raining, infrared sensors can be very negatively affected by the rain, while a sensor in a visible frequency can perfectly distinguish the objects in a scene. Infrared sensors work at night, while a sensor in the visible spectrum generally does not capture a night scene well, especially if it is a low sensitivity sensor intended more for the illumination conditions usually found during the day.

However, according to one possible implementation, the two sensors may be of different types while both operating in the same spectral band (or even in the same spectral sub-bands of the same spectral band). For example, two sensors can have very different sensitivities. In one possible implementation, the first sensor is thus a highly sensitive black and white sensor (suitable for capturing images in low light), for example having an ISO sensitivity of 12,800 (while maintaining a low noise level), and the second sensor is a much less sensitive color sensor (for example ISO 100). More generally, one can consider two sensors as being of different types when the ISO sensitivity of one is at least ten times that of the other (at an equivalent noise level).

According to the first embodiment, each second image (of the sequence of second images B(x,y,t)) is divided into elements (for example pixels or groups of pixels) each associated with a corresponding area of said second image. Implementations concerning the defining of elements and areas of the images of the sequence of first images A(x,y,t)

can be applied directly to define the elements and areas of the images of the sequence of second images B(x,y,t) and are therefore not described again.

Each second image (of the sequence of second images B(x,y,t)) corresponds to a respective first image (of the sequence of first images A(x,y,t)).

According to one possible implementation, the two sequences contain images of the same resolution, sampled at the same frequency. Thus, for each triplet of parameters {xx,yy,tt} representing an abscissa, an ordinate, and a sampling time, the element A(xx,yy,tt) of the sequence of first images corresponds (subject to, where applicable, element A(xx,yy,tt) not being part of an area not common to the two sequences of images, such as a peripheral region of the images in the case for example of separate optics, it being understood, however, that solutions for obtaining sequences that eliminate this restriction were discussed above) to element B(xx,yy,tt) of the sequence of second images (it represents the same information, in a bijective manner, measured however by a different type of sensor).

Independently of the respective resolutions and sampling rates of the sequences of first and second images, each pair of element and associated area {elt1, area1} of the second image corresponds to a respective pair of element and associated area {elt2, area2} of a corresponding first image. This correspondence is bijective in case of identical resolution and sampling frequency (constructed by the sensors or by post-processing), at least if the elements and areas are defined identically for both sequences. Otherwise, the correspondence is not bijective, and according to one possible implementation, the method defines this correspondence accordingly (without necessarily having to modify one of the two sequences to adapt it to the other sequence, let alone modifying both sequences). For example, without having to apply processing (degradation of the frequency and/or resolution of a sequence in order to align it with the other one, or conversely interpolation of the other sequence), the method may associate multiple elements of an image (of high resolution) of one of the two sequences with a single element of an image (of lower resolution) of the other sequence (spatial dimension) and similarly it may associate several images of one the two sequences with a same image of the other sequence (temporal dimension). In the case where the respective frequencies of two sequences are different but are not multiples of each other, for example if, during the same time interval, there are k images of one sequence for p images of the other sequence with k and p being integers, k less than p, and p not a multiple of k, a method according to one possible implementation associates, with image number pp (with p ranging between 0 and the number of images in the rapid sequence minus 1) of the rapid sequence, the image (pp*k)/p (the symbol "/" denotes integer division) of the sequence of lower sampling frequency. Similarly, in the case where the horizontal (respectively vertical) resolutions of the two sequences are different but are not multiples of each other, for example if there are k horizontal (respectively vertical) pixels in an image of one sequence for p horizontal (respectively vertical) pixels in an image of the other sequence where k and p are integers, k less than p, and p not a multiple of k, a method according to one possible implementation associates, with a horizontal pixel pp (with p being between 0 and the number of pixels of a row, respectively a column, minus 1) of an image of the sequence in which the images have the greatest horizontal (respectively vertical) resolution, a horizontal (respectively vertical) pixel (pp*k)/p (the symbol "/" denotes integer division) of the image of the other sequence (of lower horizontal, respectively vertical, resolution).

According to one possible implementation of the first embodiment, the method comprises capturing, by means of a third sensor of a type different from the types of the first and second sensors (or even by means of an arbitrary number of additional sensors of types that are all different from each other and all different from the types of the first and second sensors), a sequence of third images C(x,y,t) corresponding to said given scene (or even an arbitrary number of sequences of images corresponding to said given scene). The implementations described for the second sensor are transposable to any additional sensors.

According to the first embodiment, the method comprises obtaining, by a calculation circuit, a first sequence of images a(x,y,t) derived from the sequence of first images A(x,y,t). The method also comprises obtaining, by the calculation circuit, a second sequence of images b(x,y,t) derived from the sequence of second images B(x,y,t). The calculation circuit may be an electronic circuit of a type such as FPGA, ASIC, PAL, etc. The calculation circuit may also be an assembly comprising a processor and a memory (for example, RAM, ROM, EEPROM, Flash, optical memory, magnetic memory, etc.), the memory storing a computer program designed to implement this obtaining of first and second sequences of images when executed by the processor.

According to one possible implementation, the first sequence of images is simply equal to the sequence of first images. Similarly, according to one possible implementation, the second sequence of images is equal to the sequence of second images. In this case, the obtaining of the first and second sequences of images can be transparent, in other words it requires no operation. It may also be performed by simply passing a pointer, a pointer to the first (respectively second) sequence of images being defined as a copy of the pointer to the sequence of first (respectively second) images. Obtaining the first and second sequences of images can also be accomplished by copying the sequence of first (respectively second) images to another area in memory intended for storing the first (respectively second) sequence of images.

According to another possible implementation, the calculation circuit applies one (or more) transform(s) to the sequence of first (respectively second) images in order to obtain the first (respectively second) sequence of images.

For example, according to one possible implementation, the first sensor samples the sequence of first images at a different frequency (for example faster) than that at which the second sensor samples the sequence of second images (for example 100 Hz for the first sensor and 50 Hz for the second sensor, but of course the reasoning is the same in the situation where the second sensor is faster than the first). One possible implementation then consists of extracting, as the first sequence of images, a first sub-sampling of the sequence of first images captured at the highest frequency (for example, in the above case of sampling at 50 Hz and 100 Hz, only considering one out of every two images captured at 100 Hz). Of course, more sophisticated algorithms are possible. For example, according to one possible implementation, an electronic circuit calculates an average of two consecutive images at 100 Hz (from the sequence of first images) and defines it as the corresponding image (at 50 Hz) of the first sequence of images, which it associates with a respective image (also at 50 Hz) of the second sequence of images. Conversely, according to one possible implementation of the method, a calculation circuit performs an interpolation of images from the sequence of the lowest sampling frequency (sequence of second images in the above example) in order to align it with the other sequence of images (of higher frequency) and thus constructs a second sequence of images of double the frequency of the sequence of second images (this is only one possible example).

Similarly, in an alternative implementation, the resolution of the first images is different from that of the second images, and a circuit performs an interpolation of the images of lower resolution, or a sub-sampling (or a local averaging) of the images of higher resolution. An interpolation simplified to the extreme consists of duplicating the information, for example if each pixel of an image of one of the two sequences (of first and second images) corresponds to four pixels of the corresponding image of the other sequence (due to a quadrupled resolution of this other sequence), an interpolation can consist of replacing each pixel of the low resolution image by a block of four pixels identical to the initial pixel (of the low resolution image). Thus, if the sequence of second images contains images of a resolution of 2000*2000 pixels while the sequence of first images contains images of a resolution of only 1000*1000 pixels, the second sequence of images can be equal to the sequence of second images, and the first sequence of images can be a sequence in which the images, which have a resolution of 2000*2000 pixels, have for the value of pixels of coordinates (2x, 2y), (2x+1, 2y), (2x, 2y+1) and (2x+1, 2y+1) the value of the pixel of coordinates (x,y) in the corresponding image of the sequence of first images.

According to one possible implementation, the resolution and sampling frequency of the sequences of first and second images are both different, and the method combines the solutions of the two preceding paragraphs to generate a first or a second sequence of images (the other sequence may possibly be passed by pointer, as explained above, if it is not modified). Of course, it is possible that the first and second sequence of images are both generated, without one of the two simply being copied or passed by reference (for example in case of a higher sampling frequency of one of the two sequences and a higher resolution of the other sequence, if it is desired to align either with the highest performances or with the lowest performances).

It is apparent from the three previous paragraphs that it is always possible for the first and second sequences of images to contain images of identical resolution, sampled at the same frequency (either because of the operation of the sensors themselves, or because of subsequently applied processing). Each pair of element and associated area of the second image then corresponds to a respective pair of element and associated area of the corresponding first image (if the elements and areas are identified in the same manner for the first and second sequence of images). Other issues with image harmonization may arise. In principle, they are unlikely to call into question the assertion that it is possible to obtain first and second sequences of images containing images of identical resolution, sampled at the same frequency. These harmonization issues are resolved in a conventional manner, for example with (inter alia) geometric transformations to align one image with another. This may be an general translation, a correction of lens distortion, etc.

The obtaining of the first and second sequences of images may also (or alternatively) comprise other types of processing (such as the inclusion of a local average for an area, subtracted from the corresponding element in this area), as will be explained below. Thus, while obtaining the first and second sequences of images may have the object of obtaining two sequences (first and second sequences) of identical frequencies and in which the images have the same resolution, from two sequences (sequences of first and second images) of different frequencies and/or image resolutions, according to some implementations the first and second sequences of images have different frequencies and/or image resolutions.

The obtaining of the first and second sequences of images may also (or alternatively) include other types of processing such as adjustments of contrast and/or brightness, or reducing a residual difference in the field of view (parallax, etc.) between the two sensors in order to align (by digital processing) the first sequence of images and the second sequence of images more accurately than the sequence of first images and the sequence of second images are aligned. In particular, according to one possible implementation, the obtaining of the first sequence of images depends not only on the sequence of first images but also on the sequence of second images, and/or similarly the obtaining of the second sequence of images depends not only on the sequence of second images but also on the sequence of first images. Of course, according to one possible implementation, the obtaining of the first sequence of images may depend only on the sequence of first images and not on the sequence of second images, and/or similarly the obtaining of the second sequence of images may depend only on the sequence of second images and not on the sequence of first images.

Where appropriate, the method comprises an obtaining, by a calculation circuit, of a third sequence of images derived from the sequence of third images $C(x,y,t)$ and possibly additional sequences (fourth, fifth, etc.) of images derived from the sequence of additional images, according to steps similar to those described above.

According to one possible implementation of the first embodiment, the method comprises obtaining, by a calculation circuit, for each area of each of the images of the first and second sequences of images (and where applicable also for each area of each of the images of the third sequence of images and additional sequences of images), a spatial variance of said area.

The calculation circuit may pool resources (for example the processor) with the above calculation circuit, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory comprising a computer program designed to implement this obtaining of a spatial variance when it is executed by the processor.

The spatial variance is a parameter representative of the magnitude of the variations in the values of elements (for example pixels) in the area concerned.

The spatial variance of the area can be calculated from a mathematical variance of the component pixels of the area. Pixels having the values $a(x,y,t)$ (x and y varying over intervals defining a given area of the image at time t of the first sequence of images), the variance is then $VA(x,y,t)=E((a(x,y,t)-E(a(x,y,t)))^2)$ where E denotes the mathematical expectation, calculated for all values of x and y of the given area (at time t). Similarly, for the second sequence of images, $VB(x,y,t)=E((b(x,y,t)-E(b(x,y,t)))^2)$, and the formula is the same for the other possible sequences of images.

According to one possible implementation, the spatial variance is then defined as a function of the sensor noise, as follows. The standard deviation for the noise (assumed to be Gaussian white) of the first sensor is denoted sa, and the standard deviation (assumed to be Gaussian white) of the second sensor is denoted sb (one could similarly define notations for any third sensor and for any additional sensors). Such noise is a characteristic of the sensors. Generally, these characteristics are stable (what varies is the signal-to-noise ratio, more than the noise itself). We define the spatial variance as $VAr(x,y,t)=1+VA(x,y,t)/(sa^2)$ for the first sequence of images and $VBr(x,y,t)=1+VB(x,y,t)/(sb^2)$ for the second sequence of images (and similarly for the other possible sequences). For example, if an area n of the second sequence of images is between $x=xn$ and $x=xn+dxn$ and between $y=yn$ and $y=yn+dyn$, then the spatial variance of this area n is equal to $1+E((b(x,y,t)-E(b(x,y,t)))^2)/(sb^2)$, the mathematical expectations being calculated for x ranging from xn to xn+dxn and for y ranging from yn to yn+dyn.

In other implementations, the spatial variance is computed differently. Any indicator likely to reflect the fact that the elements vary greatly or on the contrary vary hardly at all can be useful. One object of such an indicator (spatial variance) is to reveal areas of "good quality" (having strong spatial variations) in order to give them more weight than the corresponding areas of other sequences of images, if these corresponding areas (i.e. areas corresponding to the same part of the scene) are of a quality that is not as good. An area of lower quality generally has less spatial variations, suggesting that the sensor concerned has not been able to discern details of the area as clearly as the other sensor (which has identified stronger variations for a corresponding area).

According to the first embodiment, the method comprises obtaining, by a calculation circuit, for each area of each of the images of the first and second sequences of images (and where applicable third sequences and even additional sequences), an associated weight (for this area). This weight is intended to reflect the level of signal-to-noise in the area. According to one possible implementation, this weight is a function of a spatial variance calculated for this area (for example according to the implementation described above). The weight associated with the area may also be a function of the spatial variance (spatial variances respectively) of the area (areas respectively) corresponding to the image of the other area (respectively areas). According to one possible implementation, the weight associated with the area is an increasing function of the spatial variance of the area.

In the event that there are only two sequences of images, one possible weight is, for an area of an image of the first sequence of images, $Wght(a(x,y,t))=VAr(x,y,t)/((VAr(x,y,t)+VBr(x,y,t))$, and for the corresponding area of the corresponding image of the second sequence of images, $Wght(b(x,y,t))=VBr(x,y,t)/(VAr(x,y,t)+VBr(x,y,t))$.

Assuming that there are n different types of sensors and that the method uses n sequences of images from the n sensors (it being understood that it is not obligatory to use the sequences of images from all available sensors), the method uses (in one possible implementation) for calculating the weights a similar formula in which the denominator includes the sum of all spatial variances for the area concerned (in other words, the spatial variances calculated for the area as it was captured by each of the n sensors). For example, for three sensors, we can define for an area of the second sequence: $Wght(b(x,y,t))=VBr(x,y,t)/(VAr(x,y,t)+VBr(x,y,t)+VCr(x,y,t))$. This calculation method has the advantage of normalizing the quality measurement for each area.

More generally, any formula revealing a relative spatial variance for the area concerned with respect to the spatial variances of all sensors can be used. One object of this weighting is to highlight the area having the greatest spatial variance, and therefore that which in theory allows the best motion detection.

The calculation circuit may pool resources (for example the processor) with one or more of the above calculation circuits, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory containing a computer program designed to implement this obtaining of a weight when executed by the processor.

According to the first embodiment, the method comprises obtaining, by a calculation circuit, a first weighted sequence of images. Each element of each image (of the first weighted sequence of images) is equal to the corresponding element (i.e. the element at the same spatiotemporal location) of the first sequence of images, weighted by the weight associated with the area (of the first sequence of images) associated with said corresponding element (of the first sequence of images). For example, each element $ap(x,y,t)$ of each image of the first weighted sequence of images is equal to the product of the corresponding element $a(x,y,t)$ of the first sequence of images times the weight $p(x,y,t)$ associated with the area corresponding to said element of the first sequence of images $(ap(x,y,t)=a(x,y,t)*p(x,y,t))$. Thus, according to one possible implementation, the first weighted sequence of images is equal to the first sequence of images in which each element (for example each pixel) of each image is replaced by this same element (understood for example as being the numerical value of the pixel representing that pixel in the image, when the element is a pixel) multiplied by the weight calculated for the area associated with this element.

The method also includes obtaining, by the calculation circuit, a second weighted sequence of images. Each element of each image (of the second weighted sequence of images) is equal to the corresponding element (i.e. the element at the same spatiotemporal location) of the second sequence of images, weighted by the weight associated with the area (of the second sequence of images) associated with said corresponding element (of the second sequence of images), for example according to an implementation of the preceding paragraph transposed to the second sequence of images.

Where appropriate, the method also includes obtaining, by the calculation circuit, at most as many weighted sequences of images as there are different sensors (it is understood that the presence of more than two sensors does not require calculating these weighted sequences for all sensors, this being only an option).

The calculation circuit may pool resources (for example the processor) with one or more of the above calculation circuits, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory containing a computer program designed to implement this obtaining of weighted sequences when executed by the processor.

According to the first embodiment, the method comprises obtaining, by a calculation circuit, a sequence of enhanced images $I(x,y,t)$ (for example, images of improved variances) resulting from combining sequences of images comprising the first weighted sequence of images and the second weighted sequence of images. This combination may be a linear combination, for example a simple sum of the weighted sequences of images, in other words a sequence of images in which each element of each image is equal to the sum of the corresponding elements of the corresponding images of the weighted sequences to be combined. According to one possible implementation, the method combines more than two weighted sequences (it can combine as many weighted sequences as there are different types of sensors considered two by two, provided that a weighted sequence has been calculated for each of these sensors). However, according to one possible implementation, the method combines only a first and a second weighted sequences (regardless of the number of sensors).

The calculation circuit may pool resources (for example the processor) with one or more of the above calculation circuits, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory comprising a computer program designed to implement this obtaining of sequences of images of improved variances when it is executed by the processor.

According to the first embodiment, the method comprises obtaining, by a calculation circuit, a motion estimation based on the obtained sequence of enhanced images $I(x,y,t)$. This motion estimation may be, for example, a global motion estimation, a dense motion estimation, or a combination of global motion estimation and dense motion estimation, as described in French patent application FR1050014 from the same Applicant. According to one possible implementation, this motion estimation is assisted by information external to that obtained by the sensors, such as GPS measurements and/or gyroscopic measurements and/or accelerometer measurements.

The calculation circuit may pool resources (for example the processor) with one or more of the above calculation circuits, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory containing a computer program designed to implement this obtaining of a motion estimation when executed by the processor.

According to the first embodiment, the method comprises obtaining, by a calculation circuit, based on the motion estimation obtained, a spatial alignment of the images of a sequence of images to be displayed derived from sequences of images corresponding to the given scene and comprising the sequence of first images $A(x,y,t)$ and the sequence of second images $B(x,y,t)$.

The sequences of images corresponding to the given scene may include sequences of images other than the sequence of first images $A(x,y,t)$ and the sequence of second images $B(x,y,t)$, and may include the first sequence of images $a(x,y,t)$, the second sequence of images $b(x,y,t)$, or a sequence of images resulting from processing one of these four sequences of images. It may also include sequences of images obtained from sensors other than the first and second sensors (for example a third sensor, or some other additional sensor), possibly processed. The characteristics of a sequence of images to be displayed are not necessarily optimized in the same manner as another type of image sequence. For example, the sequence of images of improved variances may be determined so as to maximize the spatial variances of the areas of a scene captured by a plurality of sensors and to facilitate motion detection by an appropriate algorithm, but this sequence of images is not necessarily easy for a human user to understand when displayed. It should be noted that further processing may be applied to the sequence of images to be displayed, before its display but after denoising (for example to overlay additional information such as date, time, GPS coordinates, outside temperature, or contextual information from augmented reality, etc.).

The spatial alignment of the images of a sequence of images to be displayed may involve calculating, for each image of the sequence, a vector indicating the global motion of the image relative to the preceding image. A vector $(X,Y)$ can thus indicate the horizontal shift $X$ and the vertical shift $Y$ to apply to an image so that the scene represented in this image is coincident with the same scene as captured in a reference image such as the previous image. By applying translation $(X,Y)$ to this image, it is possible to superimpose the two images (at least their common areas). For example, for two images of 1000*1000 pixels where the second is to be considered as shifted 23 pixels to the left and 17 pixels up to reflect the movement, the method can then superpose the pixels $(x_i, y_i)$ of the first image with pixels $(x_i+23, y_i+17)$ of the second image, with $x_i$ ranging from 0 to 976 and $y_i$ ranging from 0 to 982 (the area of intersection measuring 977*983 pixels). In one possible implementation, the alignment is calculated on a rolling basis over more than two images (for example ten images, but of course other values are possible), or more specifically over the area of intersection of these ten (or n for any appropriate integer n) images to be aligned. In this case, according to one possible implementation, each image of the sequence is associated with nine (or in the general case n−1) possible alignments (depending on the position that the image is likely to occupy in the sequence of images to be aligned). In an alternative implementation, only the alignment of an image relative to an adjacent image (for example the previous image) is saved, the method recalculating (where appropriate) the alignment of an image relative to an image that is not immediately adjacent by composition of the relative alignments of all the intermediate images.

A simple translation in the plane of the image may be sufficient, for example for sensors on board a vehicle in translational motion on a substantially horizontal plane (for example a road, field, or water surface) and capturing a scene relatively distant from the sensors. But a simple translation does not necessarily reflect the measured motion under all circumstances and therefore does not necessarily enable proper alignment (for example in the case of rotation along an axis perpendicular to the image plane). According to other implementations, the calculation circuit thus determines a rotation in the image plane (for example by determining an angle of rotation and a point that is a center of rotation). As above, each image may be associated with a saved record of the characteristics (center point and angle) of a rotation to be applied to the image to align it with a reference image such as the preceding image, or with as many saved records as there are images to be aligned with the image in question.

One should distinguish the motion related to the displacement of the optoelectronic device over time and the "motion" to harmonize one sensor with the other. The spatial alignment may thus comprise a static harmonization (in other words not varying over time) of one sensor with the other. The static harmonization comprises, for example, a rotation to harmonize one sensor with the other (the rotation dependent on the sensors and their relative positions and not varying over time if the relative positioning of the sensors is fixed). A static harmonization may similarly include a correction for distortion (constant) or a translation (fixed) to be applied in order to be correctly "crosseyed" at a given distance. In one possible implementation, the static harmonization is determined once for all, in the factory.

The two previous embodiments may be combined, and thus the alignment to be made between two consecutive images may be represented by a combined translation and rotation, both in the image plane.

The above two-dimensional transformations can be an excellent approximation but are not always sufficient for achieving a virtually perfect alignment between two (or more) images. According to other embodiments, the circuit refines the alignment and may also take into account a motion other than motion in the image plane. With such motion, the image considered in the sequence of images to be displayed is then aligned not only by a simple displacement of the image (which would remain identical aside from the displacement), but by a distortion of the image to reflect the measured motion. "Distortion" is understood to mean that the "distorted" image is no longer superposable on the original image, regardless of the rotations and/or translations applied in the image plane in order to attempt this superposition. Such motion may, for example, be a translation corresponding to the sensors being moved closer to or away from the scene along an axis perpendicular to the image plane. The alignment may then include applying a zoom factor (zooming in or out), each image being associated with a zoom factor to be applied with respect to at least one reference image (for example the previous image). Finally, such motion may also comprise rotations on axes not perpendicular to the image plane (for example on a horizontal axis of the image and on a vertical axis of the image). Such rotations can be simulated by image processing. Such a rotation (along an axis not perpendicular to the image axis) may result from a rotation of the sensors relative to the scene, a rotation which may be subsequent to a rotation of their support (for example a vehicle traveling over highly uneven terrain or a boat on rough water), such a rotation being measurable for example by gyroscopes embedded in the sensors to facilitate the estimation. The alignment then includes (possibly in addition to the other alignment parameters mentioned above) parameters of possible three-dimensional rotations (implying distortion of the image).

According to one possible implementation, the portion of the scene that a user of the method wishes to observe corresponds to the center of the images (or to express it differently, the user centers the sensors on the portion of the scene that interests him or her), and this portion of the scene is far from the sensors (in other words the speed of movement of the sensors relative to the scene is not likely to change the distance of the sensors from the scene noticeably over a short period of time, for example for about ten consecutive images). Movements occurring other than in the image plan can then be equated to translations in the image plane (for the two three-dimensional rotations considered) or be ignored (for changes in the distance to the scene along a perpendicular axis), at least concerning the center of the images (which according to this implementation represents the most relevant portion).

The calculation circuit may pool resources (for example the processor) with one or more of the above calculation circuits, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory containing a computer program designed to implement this obtaining of a spatial alignment (of images of a sequence of images to be displayed) when executed by the processor.

According to the first embodiment, the method includes a temporal denoising, by a calculation circuit, based on the determined spatial alignment of the sequence of images to be displayed.

For example, if the alignment consists of a translation (X,Y) to be applied to a first image relative to an adjacent image in the sequence of images to be displayed, it is then possible to superpose the two images at the intersection of these two images by a simple set of indexes (without having to apply image processing) and to apply denoising (for example an average) while generating much less blur (ideally generating no blur if the scene is stationary, the motion resulting for example from motion of the sensor(s)). Thus, in the above example in which two images of 1000*1000 pixels are such that the second is considered to be shifted 23 pixels to the left and 17 pixels up to reflect the motion, the method can calculate the average of the pixels (xi,yi) of the first image with the pixels (xi+23, yi+17) of the second image, with xi ranging from 0 to 976 and yi ranging from 0 to 982 (the area of intersection measuring 977*983 pixels). This average is used to reduce noise at these pixels. This is obviously a simplistic example for illustrative purposes, as the average is instead calculated over a greater number of elements (for example pixels) aligned with each other, and a simple average (for example the arithmetic mean) may be replaced by a more elaborate denoising algorithm. Possible techniques for temporal denoising include low-pass linear filtering techniques (temporal mean, linear filters, etc.), robust temporal mean (for example using M-estimators), and also non-linear techniques such as temporal median or sparse methods (filtering of wavelet coefficients, etc.).

The calculation circuit may pool resources (for example the processor) with one or more of the above calculation circuits, or may be a completely separate calculation circuit. The calculation circuit may be an electronic circuit of a type such as FPGA, ASIC, PAL, etc. The calculation circuit may also be an assembly comprising a processor and a memory (for example RAM, ROM, EEPROM, Flash, optical memory, magnetic memory, etc.), the memory containing a computer program designed to implement this temporal denoising when executed by the processor.

According to a second embodiment, a method for temporal denoising of a sequence of images according to the first embodiment comprises selecting, by a selection circuit, as a sequence of images to be displayed which is denoised in step /i/, one among the sequence of first images A(x,y,t) and the sequence of second images B(x,y,t).

Thus, according to one possible implementation, the method detects a press of a button that allows a human user to switch between the first sequence of first images (for example images captured with a sensor in the spectrum visible to humans) and the sequence of second images (for example images captured in the infrared spectrum).

According to one possible implementation, the method automatically selects the sequence of images to be displayed (for example a sequence of images in the infrared at night and a sequence of color images during the day).

According to one possible implementation, the method makes the selection based on configuration information or selection information received for example via a telecommunications network.

According to a third embodiment, a temporal denoising method according to the first or second embodiment comprises the following steps, for the purpose of obtaining, by a calculation circuit, a first sequence of images $a(x,y,t)$ derived from the sequence of first images $A(x,y,t)$ and obtaining, by the calculation circuit, a second sequence of images $b(x,y,t)$ derived from the sequence of second images $B(x,y,t)$.

This method comprises obtaining, by the calculation circuit, for each area of each of the images of the sequence of first images $A(x,y,t)$ and of the sequence of second images $B(x,y,t)$, a local average of said area. This local average is, for example, an arithmetic mean such as the ratio of the sum of the pixel values of the area to the number of pixels in the area. However, other averages are possible (geometric mean, etc.).

Obtaining the first sequence of images $a(x,y,t)$ comprises subtracting (by the calculation circuit), from each element of each image of the sequence of first images $A(x,y,t)$, the local average of the area corresponding to said element, and obtaining the second sequence of images $b(x,y,t)$ comprises subtracting (by the calculation circuit), from each element of each image of the sequence of second images $B(x,y,t)$, the local average of the area corresponding to said element.

Thus, variations in the pixel values of the areas are increased in a relative manner (since they are centered on the origin instead of being centered on a value that may be large in comparison to these variations).

This could completely distort the perception of the image by the human eye but highlights (for a calculation circuit, which is an electronic component) the variations and allows identifying which of the two sensors is, for the area concerned, providing data that allow the best motion estimation.

Of course, other processing is possible in addition to subtracting the local average, as has been previously described. After subtracting the local average it is thus possible, for example, to sub-sample the first sequence of images $a(x,y,t)$ if it has a lower resolution than that of the second sequence of images $b(x,y,t)$, etc.

According to a fourth embodiment, a temporal denoising method according to one of the first to third embodiments is based on a first sensor and a second sensor which are spatially non-harmonized.

The temporal denoising method comprises the following steps, for the purpose of obtaining, by a calculation circuit, a first sequence of images $a(x,y,t)$ derived from the sequence of first images $A(x,y,t)$ and obtaining, by the calculation circuit, a second sequence of images $b(x,y,t)$ derived from the sequence of second images $B(x,y,t)$.

The method comprises obtaining, by a calculation circuit, a first sequence of images $a(x,y,t)$ resulting from pre-smoothing the sequence of first images $A(x,y,t)$, and a second sequence of images $b(x,y,t)$ resulting from pre-smoothing the sequence of second images $(B(x,y,t))$.

Thus, with this fourth embodiment, the method works even in the presence of uncorrected parallax between the two sensors, provided that the offset between the images from the two sensors is small compared to the blur introduced.

More specifically, in the case of a heterogeneous dual-sensor system (two different types of sensors), in particular a heterogeneous dual-sensor system using separate optics for each sensor, precise harmonization of the two sensors (in other words the fact that for any given triplet $\{x_0, y_0, t_0\}$, point $A(x_0, y_0, t_0)$ and point $B(x_0, y_0, t_0)$ correspond to the same point of the imaged scene at the same time on both sensors) can be very complex, and even in some cases will not be possible. Indeed, if the scene projected on the imagers has multiple depths, the spatial harmonization vector between the two sensors is dense and must be estimated by complex techniques: estimation of heterogeneous dense motion, readjustment to a digital model of the terrain, use of active imaging, etc.

Assuming an imprecise spatial harmonization, the calculation of $I(x,y,t)$ from $A(x,y,t)$ and $B(x,y,t)$ described above is spatially imprecise since points $A(x,y,t)$ and $B(x,y,t)$ do not exactly coincide. However, by applying spatial pre-smoothing to images $A(x,y,t)$ and $B(x,y,t)$, and choosing a spatial smoothing scale such that the expected maximum harmonization error is negligible at that scale, the method obtains an image $I(x,y,t)$ containing information that is reliable at the spatial scale of the pre-smoothing.

Under these conditions, the method uses, for example, a technique for measuring differential motion (over $I(x,y,t)$), such a technique being based on a constraint equation of the apparent motion, and requiring (in one possible implementation) just one pre-smoothing of the image so that the variations in light intensity are slow compared to the range of motion to be measured.

According to the fourth embodiment, harmonization inaccuracies become completely transparent, and do not hamper in any way the ability to merge information from the sensors when reconstructing the video.

According to a fifth embodiment, a computer program comprises a sequence of instructions which, when executed by a processor, lead the processor to implement a temporal denoising method according to one of the first to fourth embodiments.

The computer program may be written in any suitable programming language such as very low-level languages (assembler type) or in C for example.

According to a sixth embodiment, a non-transitory computer-readable storage medium stores a computer program according to the fifth embodiment. The storage medium is, for example, a memory of a type such as ROM, EEPROM, Flash, battery-backed RAM, optical memory, or magnetic memory.

A seventh embodiment relates to an optoelectronic device for temporal denoising of a sequence of images.

This optoelectronic device may be, for example, a pair of binoculars, or a viewing system mounted on a vehicle, for example on a tank turret.

The optoelectronic device is arranged to implement the method according to one of the first to fourth embodiments.

All implementations described in relation to the method are transposable to the device (and vice versa).

According to one possible implementation, the optoelectronic device comprises a storage medium according to the sixth embodiment, which, according to some possible implementations, is integrated within a calculation circuit (either in the form of discrete electronic components, or in the same electronic component, such as a microcontroller or a DSP). According to one possible implementation, the optoelectronic device comprises calculation circuits implemented in a form comprising a single processor (possibly multi-core), a nonvolatile memory (for example ROM, EEPROM, Flash, battery-backed RAM, optical memory, or magnetic memory) storing a set of computer programs each designed to perform a particular task (and each corresponding to a respective calculation circuit), and working memory (for example RAM).

The optoelectronic device comprises a first sensor arranged to capture a sequence of first images $A(x,y,t)$ corresponding to a given scene, each first image being divided into elements each associated with a corresponding area of said first image.

The optoelectronic device comprises a second sensor, of a different type than the first sensor, arranged to capture a sequence of second images B(x,y,t) corresponding to said given scene, each second image corresponding to a first image, each second image being divided into elements each associated with a corresponding area of said second image, each pair of element and associated area of the second image corresponding to a pair of element and associated area of the corresponding first image.

The optoelectronic device comprises a calculation circuit arranged to obtain a first sequence of images a(x,y,t) derived from the sequence of first images A(x,y,t) and a second sequence of images b(x,y,t) derived from the sequence of second images B(x,y,t).

The optoelectronic device comprises, in one possible implementation, a calculation circuit arranged to obtain, for each area of each of the images of the first and second sequences of images, a spatial variance for that area.

The optoelectronic device comprises a calculation circuit arranged to obtain, for each area of each of the images of the first and second sequences of images, an associated weight (if applicable as a function of the spatial variance obtained for that area).

The optoelectronic device comprises a calculation circuit arranged to obtain a first weighted sequence of images, in which each element of each image is equal to the corresponding element of the first sequence of images weighted by the weight associated with the area corresponding to said corresponding element (of the first sequence of images) and a second weighted sequence of images, in which each element of each image is equal to the corresponding element of the second sequence of images weighted by the weight associated with the area corresponding to said corresponding element (of the second sequence of images).

The optoelectronic device comprises a calculation circuit arranged to obtain a sequence of enhanced images I(x,y,t) resulting from combining sequences of images comprising the first weighted sequence of images and the second weighted sequence of images.

The optoelectronic device comprises a calculation circuit arranged to obtain a motion estimation based on the obtained sequence of enhanced images I(x,y,t).

The optoelectronic device comprises a calculation circuit arranged to obtain, based on the calculated motion estimation, a spatial alignment of the images of a sequence of images to be displayed derived from sequences of images corresponding to the given scene and comprising the sequence of first images A(x,y,t) and the sequence of second images B(x,y,t).

The optoelectronic device comprises a calculation circuit arranged to perform a temporal denoising, based on the determined spatial alignment of the sequence of images to be displayed.

According to an eighth embodiment, an optoelectronic device according to the seventh embodiment comprises a selection circuit arranged to select, as a sequence of images to be displayed which is to be denoised, one among the sequence of first images A(x,y,t) and the sequence of second images B(x,y,t).

According to a ninth embodiment, the calculation circuit arranged to obtain the first and second sequences of images, of an optoelectronic device according to the seventh or eighth embodiment, is arranged to calculate, for each area of each of the images of the sequence of first images A(x,y,t) and of the sequence of second images B(x,y,t), a local average of said area, then to obtain the first sequence of images a(x,y,t) by subtracting, from each element of each image of the sequence of first images A(x,y,t), the local average of the area corresponding to said element, and to obtain the sequence of second images b(x,y,t) by subtracting, from each element of each image of the sequence of second images B(x,y,t), the local average of the area corresponding to said element.

According to a tenth embodiment, the first sensor and the second sensor of an optoelectronic device according to one among the seventh to ninth embodiments are not spatially harmonized. The calculation circuit arranged to obtain the first and second sequences of images is arranged to obtain a first sequence of images a(x,y,t) resulting from pre-smoothing the sequence of first images A(x,y,t) and a second sequence of images b(x,y,t) resulting from pre-smoothing the sequence of second images B(x,y,t).

FIG. 1 illustrates an exemplary optoelectronic device according to one possible embodiment of the invention. This optoelectronic device is a dual-sensor system SYS that is spatially and temporally harmonized.

The dual-sensor system SYS comprises a single set of optics (not shown) through which a signal SCN representing the observed scene is received. The signal SCN reaches a beamsplitter BS which may be a partially reflecting mirror or other suitable material (for example based on prisms). The beamsplitter BS separates the signal SCN into two identical beams (aside from the luminous intensity) to be sent to a first sensor SENS_A and a second sensor SENS_B, which respectively obtain information A(x,y,t) and B(x,y,t) representing image sequences representing the signal SCN. The sensors SENS_A and SENS_B transmit (dotted lines in FIG. 1) the information A(x,y,t) and B(x,y,t) to a calculation circuit C_CIRC.

The calculation circuit C_CIRC of the dual-sensor system SYS combines the information contained in A(x,y,t) and B(x,y,t) (obtained by the two sensors) in order to denoise A(x,y,t) and/or B(x,y,t). The images from the two sensors are spatially and temporally harmonized, meaning that point A(x,y,t) and point B(x,y,t) correspond to the same point in the scene, imaged at the same time by the two sensors. The spatial harmonization results mainly from the single set of optics, and from the adjustment of the relative positioning of the beamsplitter BS and the first and second sensors SENS_A and SENS_B. The temporal harmonization results for example from the temporal synchronization of the sensors SENS_A and SENS_B. This temporal synchronization (simultaneous sampling by both sensors) can be obtained for example by using a common clock for the two sensors, or by regular synchronization of the respective clocks of the two sensors, or by a quality of the two clocks that ensures that their relative drift is negligible. The spatial and temporal harmonization of the sensors does not necessarily imply identical spatial and temporal resolutions for the two sensors. However, according to one possible implementation, these spatial resolutions (for example in DPI, i.e. number of pixels per inch, along the x-axis and y-axis) and temporal resolutions (for example in Hz) are the same.

The noise model for the sensors is known. The parameters of the noise model for the two sensors are either known or are calculated using estimation techniques known to the skilled person. More specifically, in the example considered, the noise is assumed to be Gaussian white, and of respective standard deviations sa and sb for the sensors SENS_A and SENS_B.

Figure 2:
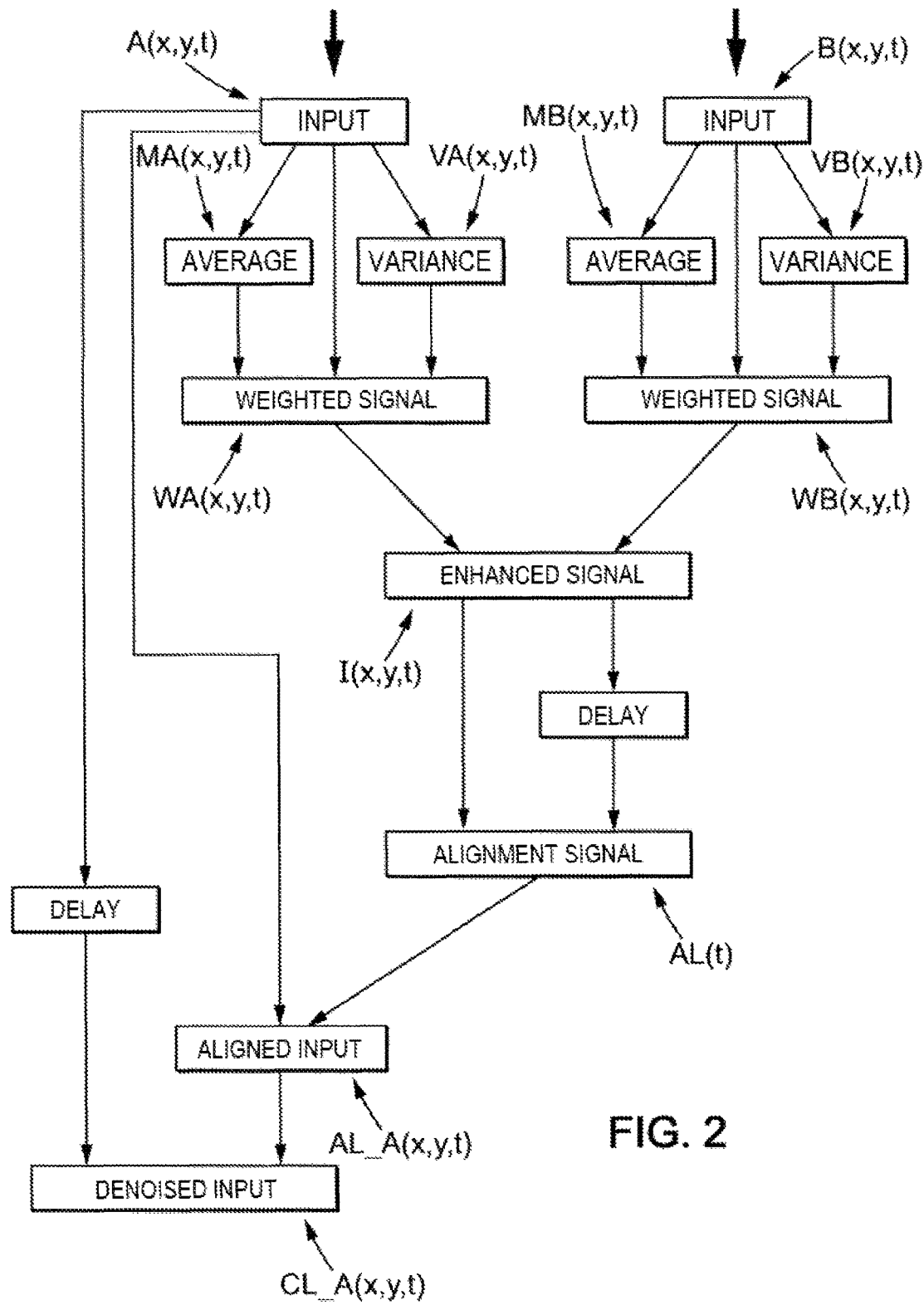
FIG. 2 illustrates different steps implemented by the optoelectronic device of FIG. 1.

FIG. 2 shows different steps implemented by the above dual-sensor system SYS.

The dual-sensor system SYS is arranged to calculate an image I(x,y,t) referred to as the "better information image" corresponding to an image combining information from the two channels (meaning the information A(x,y,t) and B(x,y,t) respectively from sensors SENS_A and SENS_B). This image is then used for the motion estimation.

The image I(x,y,t) has the general form:

$$I(x,y,t)=\text{Wght}(A(x,y,t))*\text{Transfo}(A(x,y,t))+\text{Wght}(B(x,y,t))*\text{Transfo}(B(x,y,t))$$

Wght( ) is a weighting function which depends on its argument, and Transfo( ) is a function for transforming the gray levels of its argument. If one of the two images A(x,y,t) and B(x,y,t) (or both) is not "monochrome" but has several channels, for example such as a red-green-blue color image, then this image is reduced to a monochrome image (meaning single channel). For example, for each RGB element (consisting of three pixels, red, green, and blue) of the color image there is a "black and white" element of a monochrome image (determined for the occasion) associated by calculating, for each element of the color image, the luminance corresponding to this element of the color image, for example from a weighted sum of the three channels. This luminance then represents the corresponding element of the monochrome image (it is for example coded in one byte to represent 256 possible luminance levels).

The following example of calculating I(x,y,t) consists of calculating a representative image of better local spatial variance, from images A(x,y,t) and B(x,y,t).

To calculate I(x,y,t), the calculation circuit C_CIRC of the dual sensor system SYS first calculates the local spatial variances and averages of each of the two images. These are calculated in a rolling manner over all the pixels. The calculation circuit C_CIRC thus obtains images of local spatial variances and averages, denoted MA(x,y,t) and MB(x,y,t) for the averages, and VA(x,y,t) and VB(x,y,t) for the variances. The spatial extent of the neighborhood over which the local variances and averages are calculated (the window size) is indexed to the spatial extent of the motion measurement processing that is used at the end. The local variances and averages may be calculated in a multi-scalar manner, if the motion measurement technique is itself multi-scalar. The case of a single scale is described below.

The calculation circuit C_CIRC then calculates normalized images NA(x,y,t) and PN(x,y,t) by:

$$NA(x,y,t)=A(x,y,t)-MA(x,y,t)$$

$$NB(x,y,t)=B(x,y,t)-MB(x,y,t)$$

These normalized images have a spatial average of zero.

The calculation circuit C_CIRC then calculates the representative local spatial variances VAr(x,y,t) and VBr(x,y,t), which link the activity in the images to their respective noise:

$$VAr(x,y,t)=1+VA(x,y,t)/sa^2$$

$$VBr(x,y,t)=1+VB(x,y,t)/sb^2$$

The images thus calculated (representing the representative local spatial variances) tend towards 1 when the local spatial variance tends towards zero. Conversely, these images take significant values when the local activity of the images is large compared to their noise.

Lastly, the calculation circuit C_CIRC calculates the image of better representative local spatial variance I(x,y,t) by:

$$I(x,y,t)=WA(x,y,t)+WB(x,y,t)$$

where:

$$WA(x,y,t)=\text{Wght}(A(x,y,t))*\text{Transfo}(A(x,y,t))$$

$$WB(x,y,t)=\text{Wght}(B(x,y,t))*\text{Transfo}(B(x,y,t))$$

$$\text{Wght}(A(x,y,t))=VAr(x,y,t)/(VAr(x,y,t)+VBr(x,y,t))$$

$$\text{Wght}(B(x,y,t))=VBr(x,y,t)/(VAr(x,y,t)+VBr(x,y,t))$$

$$\text{Transfo}(A(x,y,t))=NA(x,y,t)$$

$$\text{Transfo}(B(x,y,t))=NB(x,y,t)$$

This image I(x,y,t) is an image that merges images A(x,y,t) and B(x,y,t), with locally a higher weight for the image that has a strong local variance regarding its own noise. In particular, if for example at point (x,y,t) the quantity VAr(x,y,t) is predominant with respect to quantity VBr(x,y,t), then I(x,y,t) will be approximately equivalent to (in other words close to) NA(x,y,t). If the amounts VAr(x,y,t) and VBr(x,y,t) are equivalent (in other words close), then the images NA(x,y,t) and NB(x,y,t) are weighted in an equivalent manner.

The calculation circuit C_CIRC then uses this image I(x,y,t) in the analysis phase of the denoising processing. This analysis phase includes a spatial alignment of the images to be denoised (this is not a question of spatially aligning two images respectively obtained from the first sensor and second sensor, but spatially aligning consecutive images from the same sensor). In the example of FIG. 2, it is the image of the first sensor (represented by A(x,y,t)) which is denoised. To achieve this spatial alignment, the calculation circuit C_CIRC measures the apparent motion in the image. It performs this measurement in images I(x,y,t), with t varying within an appropriate window. In effect, I(x,y,t) is of better quality than A(x,y,t) (or at least, in the worst case, of at least the same quality). The calculation circuit C_CIRC thus obtains a global alignment signal AL(t) (in a more complex implementation not shown in FIG. 2, the alignment signal is dense and depends on the three parameters x, y and t rather than on only parameter t). This is obtained based on accessing image I(x,y,t−1), which can be done via a buffer (DELAY box in FIG. 2) storing the last image I(x,y,t) which at the next time t corresponds to image I(x,y,t−1). The alignment signal AL(t) indicates the displacement to be applied to image I(x,y,t) to align it with image I(x,y,t−1) (and therefore the displacement to be applied to image A(x,y,t) to align it with image A(x,y,t−1), which is the same displacement). Once this spatial alignment is applied to signal A(x,y,t), the calculation circuit C_CIRC obtains a signal AL_A(x,y,t), which is an input signal A(x,y,t) aligned with the input signal at the preceding time A(x,y,t−1).

Alternatively, the signal which is aligned is the delayed signal A(x,y,t−1) (aligned on A(x,y,t), instead of aligning A(x,y,t) on A(x,y,t−1)). The calculation circuit C_CIRC then calculates a "clean" (denoised) signal CL_A(x,y,t) by normalizing the aligned input AL_A(x,y,t) and the previous input A(x,y,t−1). The mechanism that allows obtaining the previous input (DELAY box in FIG. 2) is, for example, a buffer. The unmodified input which is used as an input parameter in calculating CL_A(x,y,t) (in conjunction with the aligned input) is indeed a delayed input.

In general, the temporal normalization step is performed on A(x,y,t) or B(x,y,t) (not necessarily on A(x,y,t) as shown in FIG. 2), and can be applied to more than two consecutive images. The normalization is guided by the result of the motion estimation performed on image I(x,y,t). With this method, the motion estimation is thus achieved in an optimized manner, taking advantage of the best combination of sensors (for example based on spectral information which is different for each sensor). The method thus improves the denoising of image A(x,y,t), even if image A(x,y,t) has a very bad signal-to-noise ratio, as long as it is possible to compensate with image B(x,y,t), and vice versa.

The function for weighting images A(x,y,t) and B(x,y,t) to form image I(x,y,t) may also be any weighting function that allows generating a relevant merged image in the sense of the local signal-to-noise ratio (and not necessarily the weighting function described above).

Of course, the invention is not limited to the embodiments described above as examples; it extends to other variants.

The invention claimed is:

1. A method for temporal denoising of a sequence of images, said method comprising:
   /a/ capturing, by a first sensor, a sequence of first images corresponding to a given scene, each first image being divided into elements each associated with a corresponding area of said first image,
   /b/ capturing, by a second sensor of a type different from the type of the first sensor, a sequence of second images corresponding to said given scene, each second image corresponding to a first image, each second image being divided into elements each associated with a corresponding area of said second image, each pair of element and associated area of the second image corresponding to a pair of element and associated area of the corresponding first image, and
   /c/ obtaining, by calculation circuitry, a first sequence of images derived from the sequence of first images and a second sequence of images derived from the sequence of second images,
   /d/ obtaining, by the calculation circuitry, for each area of each of the images of the first and second sequences of images, an associated weight,
   /e/ obtaining, by the calculation circuitry, a first weighted sequence of images, in which each element of each image is equal to the corresponding element of the first sequence of images weighted by the weight associated with the area associated with said corresponding element, and a second weighted sequence of images, in which each element of each image is equal to the corresponding element of the second sequence of images weighted by the weight associated with the area associated with said corresponding element,
   /f/ obtaining, by the calculation circuitry, a sequence of enhanced images resulting from combining sequences of images comprising the first weighted sequence of images and the second weighted sequence of images,
   /g/ obtaining, by the calculation circuitry, a motion estimation based on the obtained sequence of enhanced images,
   /h/ obtaining, by the calculation circuitry, based on the calculated motion estimation, a spatial alignment of the images of a sequence of images to be displayed derived from sequences of images corresponding to the given scene and comprising the sequence of first images and the sequence of second images,
   /i/ a temporal denoising, by the calculation circuitry, based on the determined spatial alignment of the sequence of images to be displayed.

2. The method according to claim 1, comprising selecting, by a selection circuit, as the sequence of images to be displayed which is denoised in step /i/, one among the sequence of first images and the sequence of second images.

3. The method according to claim 1, comprising, in step /c/:
   obtaining, by the calculation circuitry, for each area of each of the images of the sequence of first images and of the sequence of second images, a local average of said area, and
   obtaining, by the calculation circuitry, the first sequence of images, comprising subtracting, from each element of each image of the sequence of first images, the local average of the area corresponding to said element, and obtaining the second sequence of images, comprising subtracting, from each element of each image of the sequence of second images, the local average of the area corresponding to said element.

4. The method according to claim 1, wherein the first sensor and the second sensor are not spatially harmonized, the method comprising, in step /c/, obtaining, by the calculation circuitry, the first sequence of images resulting from pre-smoothing the sequence of first images and the second sequence of images resulting from pre-smoothing the sequence of second images.

5. A non-transitory computer-readable storage medium, said medium storing a computer program comprising instructions which, when executed by a processor, lead the processor to implement steps comprising:
   /a/ capturing, by a first sensor, a sequence of first images corresponding to a given scene, each first image being divided into elements each associated with a corresponding area of said first image,
   /b/ capturing, by a second sensor of a type different from the type of the first sensor, a sequence of second images corresponding to said given scene, each second image corresponding to a first image, each second image being divided into elements each associated with a corresponding area of said second image, each pair of element and associated area of the second image corresponding to a pair of element and associated area of the corresponding first image, and
   /c/ obtaining, by calculation circuitry, a first sequence of images derived from the sequence of first images and a second sequence of images derived from the sequence of second images,
   /d/ obtaining, by the calculation circuitry, for each area of each of the images of the first and second sequences of images, an associated weight,
   /e/ obtaining, by the calculation circuitry, a first weighted sequence of images, in which each element of each image is equal to the corresponding element of the first sequence of images weighted by the weight associated with the area associated with said corresponding element, and a second weighted sequence of images, in which each element of each image is equal to the corresponding element of the second sequence of images weighted by the weight associated with the area associated with said corresponding element,
   /f/ obtaining, by the calculation circuitry, a sequence of enhanced images resulting from combining sequences of images comprising the first weighted sequence of images and the second weighted sequence of images,
   /g/ obtaining, by the calculation circuitry, a motion estimation based on the obtained sequence of enhanced images,
   /h/ obtaining, by the calculation circuitry, based on the calculated motion estimation, a spatial alignment of the images of a sequence of images to be displayed derived from sequences of images corresponding to the given scene and comprising the sequence of first images and the sequence of second images, /i/ a temporal denoising, by the calculation circuitry, based on the determined spatial alignment of the sequence of images to be displayed.

6. The non-transitory computer-readable storage medium according to claim 5, the steps further comprising selecting, by a selection circuit, as the sequence of images to be displayed which is denoised in step /i/, one among the sequence of first images and the sequence of second images.

7. The non-transitory computer-readable storage medium according to claim 5, the steps further comprising, in step /c/:
  obtaining, by the calculation circuitry, for each area of each of the images of the sequence of first images and of the sequence of second images, a local average of said area, and
  obtaining, by the calculation circuitry, the first sequence of images, comprising subtracting, from each element of each image of the sequence of first images, the local average of the area corresponding to said element, and obtaining the second sequence of images, comprising subtracting, from each element of each image of the sequence of second images, the local average of the area corresponding to said element.

8. The non-transitory computer-readable storage medium according to claim 5, wherein the first sensor and the second sensor are not spatially harmonized, the steps further comprising, in step /c/, obtaining, by the calculation circuitry, the first sequence of images resulting from pre-smoothing the sequence of first images and the second sequence of images resulting from pre-smoothing the sequence of second images.

9. An optoelectronic device for temporal denoising of a sequence of images, said optoelectronic device comprising:
  a first sensor arranged to capture a sequence of first images corresponding to a given scene, each first image being divided into elements each associated with a corresponding area of said first image,
  a second sensor of a type different from the type of the first sensor, arranged to capture a sequence of second images corresponding to said given scene, each second image corresponding to a first image, each second image being divided into elements each associated with a corresponding area of said second image, each pair of element and associated area of the second image corresponding to a pair of element and associated area of the corresponding first image,
  calculation circuitry arranged to obtain a first sequence of images derived from the sequence of first images and a second sequence of images derived from the sequence of second images,
  the calculation circuitry further arranged to obtain, for each area of each of the images of the first and second sequences of images, an associated weight,
  the calculation circuitry further arranged to obtain a first weighted sequence of images, in which each element of each image is equal to the corresponding element of the first sequence of images weighted by the weight associated with the area associated with said corresponding element; and a second weighted sequence of images, in which each element of each image is equal to the corresponding element of the second sequence of images weighted by the weight associated with the area associated with said corresponding element,
  the calculation circuitry further arranged to obtain a sequence of enhanced images resulting from combining sequences of images comprising the first weighted sequence of images and the second weighted sequence of images,
  the calculation circuitry further arranged to obtain a motion estimation based on the obtained sequence of enhanced images,
  the calculation circuitry further arranged to obtain, based on the calculated motion estimation, a spatial alignment of the images of a sequence of images to be displayed derived from sequences of images corresponding to the given scene and comprising the sequence of first images and the sequence of second images,
  the calculation circuitry further arranged to perform a temporal denoising, based on the determined spatial alignment of the sequence of images to be displayed.

10. The optoelectronic device according to claim 9, comprising a selection circuit arranged to select, as the sequence of images to be displayed which are to be denoised, one among the sequence of first images and the sequence of second images.

11. The optoelectronic device according to claim 9, the calculation circuitry arranged to obtain the first and second sequences of images is further arranged to calculate, for each area of each of the images of the sequence of first images and of the sequence of second images, a local average of said area, then to obtain the first sequence of images by subtracting, from each element of each image of the sequence of first images, the local average of the area corresponding to said element, and to obtain the sequence of second images by subtracting, from each element of each image of the sequence of second images, the local average of the area corresponding to said element.

12. The optoelectronic device according to claim 9, wherein the first sensor and the second sensor are not spatially harmonized, the calculation circuitry arranged to obtain the first and second sequences of images is further arranged to obtain the first sequence of images resulting from pre-smoothing the sequence of first images and the second sequence of images resulting from pre-smoothing the sequence of second images.

* * * * *